Feb. 25, 1941.  M. P. PEREZ  2,232,726
COMBINED AUTOMATIC AND MANUALLY CONTROLLED BRAKE
SETTING MECHANISM FOR MOTOR VEHICLES
Filed Nov. 9, 1939  3 Sheets-Sheet 2
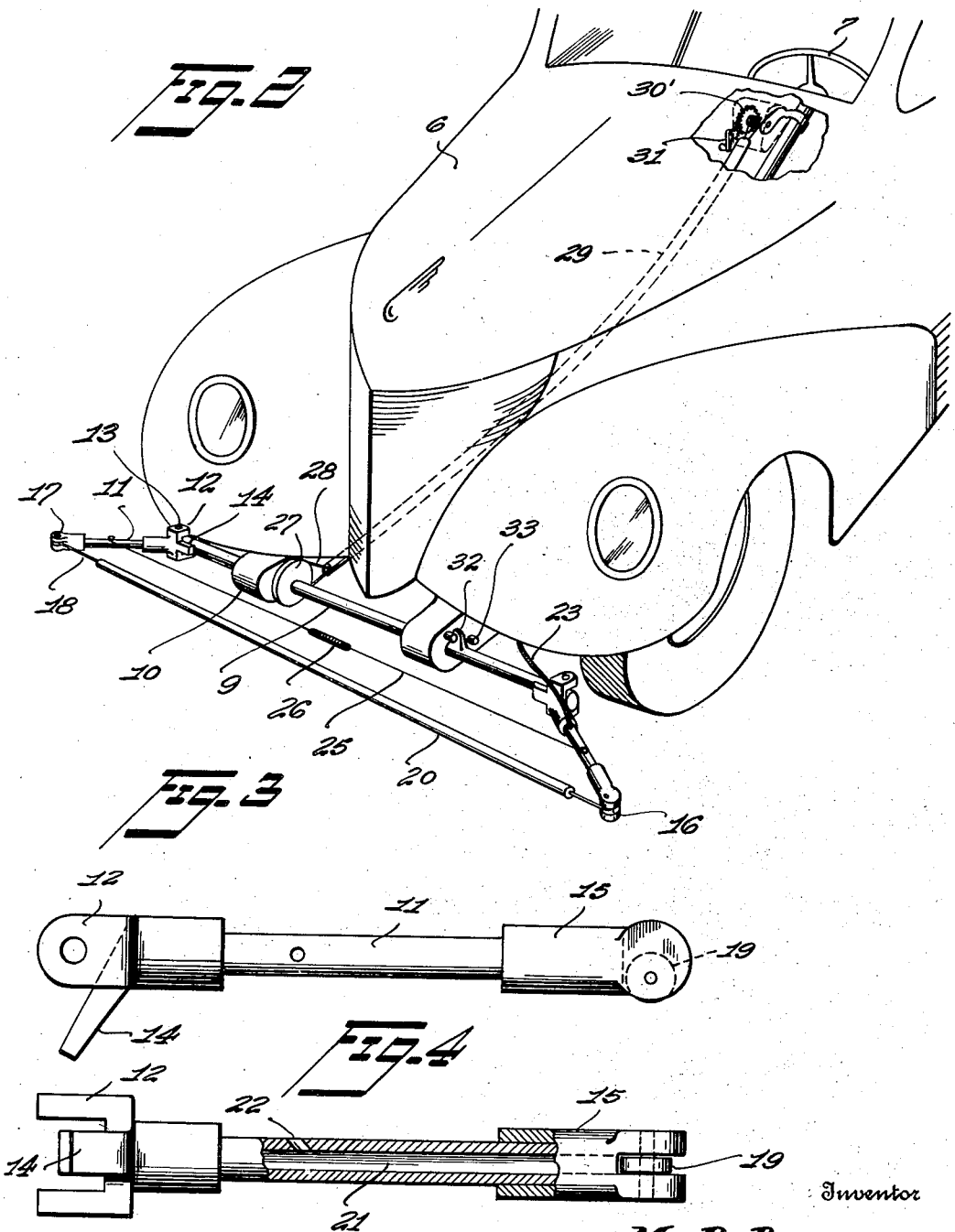
Inventor
M. P. Perez
By Lacey & Lacey, Attorneys

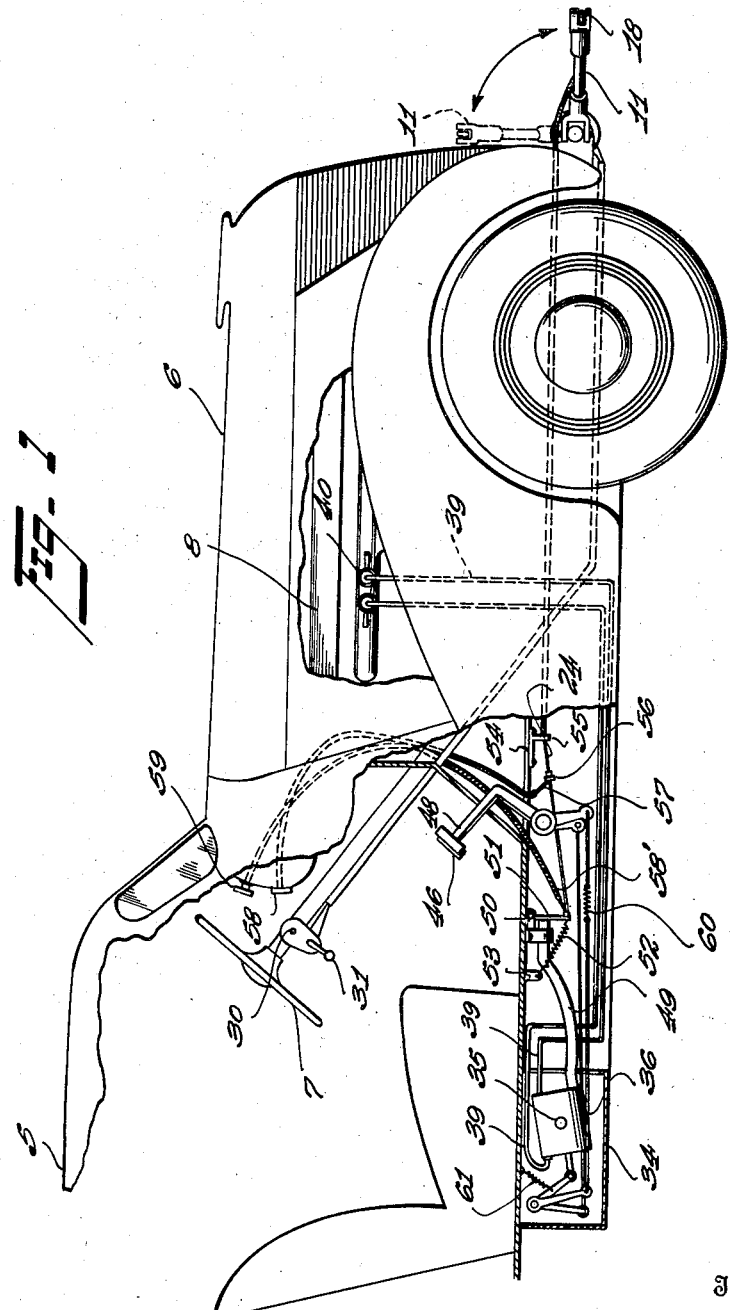

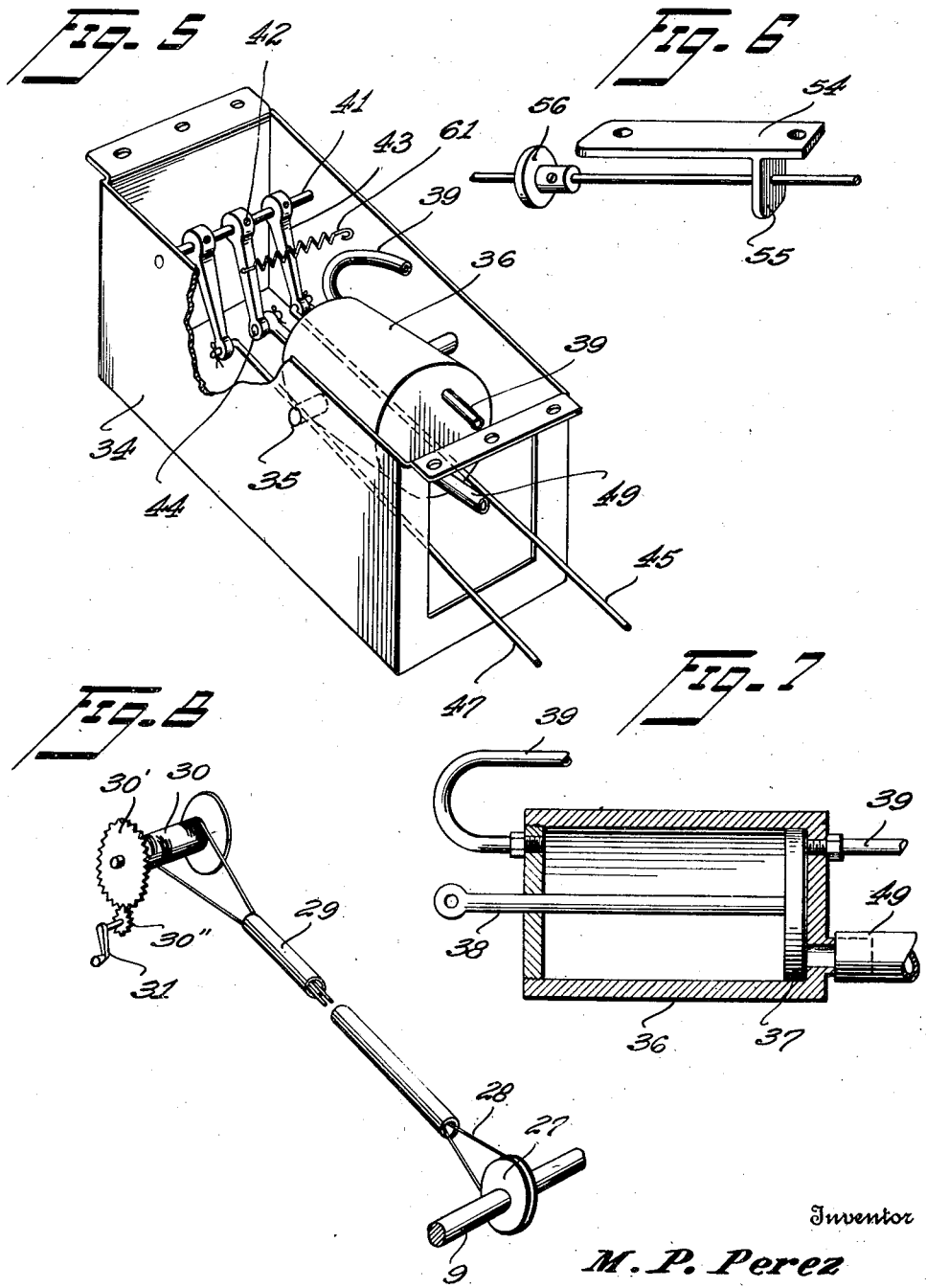

Patented Feb. 25, 1941

2,232,726

UNITED STATES PATENT OFFICE 2,232,726

COMBINED AUTOMATIC AND MANUALLY CONTROLLED BRAKE SETTING MECHANISM FOR MOTOR VEHICLES

Miguel Padilla Perez, New York, N. Y., assignor of one-half to Ramon Matos, New York, N. Y.

Application November 9, 1939, Serial No. 303,684

14 Claims. (Cl. 180—83)

This invention relates to safety devices for motor driven vehicles and more particularly to a combined automatic and manually controlled brake setting mechanism for such vehicles.

The object of the invention is to provide an automobile or other motor driven vehicle having means mounted on the front end thereof and operatively connected with the clutch and brake pedals, respectively, for automatically stopping said vehicle and simultaneously cutting out the ignition switch in case the vehicle strikes a pedestrian or other object in the path of travel of the automobile, thereby preventing injury to pedestrians and reducing to a minimum fire hazard after collision.

A further object of the invention is to provide manually operable emergency means for arresting the forward movement of the vehicle in case of impending collision and means for rendering the automatic brake-applying mechanism inoperative until said mechanism is manually reset so as to prevent a hit and run driver from leaving the scene of the collision illegally.

A further important object of the invention is to provide a novel form of brake-applying fender including a flexible element mounted on pivoted supporting brackets at the front of the vehicle and extending transversely thereof, said flexible element being operatively connected with a vacuum cylinder so that, when the flexible element is pressed inwardly by contact with an object in the path of travel of a vehicle, said vacuum cylinder will actuate the brake and clutch mechanism to automatically stop the vehicle.

A further object is to mount the flexible element and its supporting brackets on the front of the vehicle in such a manner as to permit the same to be folded upwardly against the hood of said vehicle so as to be out of the way when parking, means being mounted on the steering wheel and operatively connected with the fender for raising and lowering the same.

A still further object of the invention is generally to improve this class of devices so as to increase their utility, durability and efficiency.

Further objects and advantages will appear in the course of the following description and drawings, in which:

Figure 1 is a side elevation, partly in section, of a motor driven vehicle provided with my improved safety device, Figure 2 is a perspective view of the front portion of an automobile showing the manner of mounting the brake-applying fender thereon, Figure 3 is a top plan view of one of the cable supporting brackets detached, Figure 4 is a top plan view, partly in section, of said bracket, Figure 5 is a perspective view of the vacuum cylinder and its associated parts detached, Figure 6 is a perspective view of the coacting elements constituting the stop mechanism for the main operating cable, Figure 7 is a vertical sectional view of the vacuum cylinder, and Figure 8 is a perspective view of the mechanism employed for raising and lowering the flexible fender.

The combined automatic and manually controlled brake setting mechanism forming the subject-matter of the present invention may be used in connection with any standard make of motor vehicle, and by way of illustration is shown applied to an automobile of conventional construction, in which 5 designates the body portion, 6 the hood, 7 the steering wheel and 8 the manifold.

Disposed at the front of the vehicle is a flexible brake-actuating fender comprising a rock shaft 9 extending transversely of the vehicle and journaled in suitable bearings formed in the projecting ends 10 of the automobile chassis, as shown. Pivotally mounted on the opposite ends of the rock shaft 9 are diverging supporting arms or brackets 11 provided with inwardly extending ears 12 disposed above and below the rock shaft and hingedly connected therewith by pivot pins 13. The rear ends of the brackets 11 are provided with lateral stop fingers 14 which normally bear against the rock shaft and serve to limit the inward swinging movement of the brackets. The outer ends of the brackets are fitted with sleeves 15 having their terminals bifurcated at 16. Extending through the bifurcated portion of one of the brackets 11 is a pin 17 to which is anchored one end of a flexible contact member or cable 18 and the other end of which extends around a roller 19 journaled in the bifurcated portion of the mating bracket, said flexible member or cable serving to receive the impact of a pedestrian or other object in the path of travel of a vehicle for the purpose of operating the brakes and stopping the automobile, as will be more fully described hereinafter.

The flexible contact member 18 is preferably covered with rubber or other yieldable material 20 so as to prevent injury to a pedestrian coming in contact therewith. The brackets 11 are hollow to provide passages 21, through one of which extends the adjacent portion of the flexible contact member 18, said member passing through an opening 22 communicating with the passage 21 and thence through an armored conduit 23 to form an operating cable 24 extending to the rear portion of the vehicle, as shown.

It will thus be seen that should the fender strike a pedestrian or other object in the path of travel of the automobile the impact on the flexible member 18 will press said flexible member rearwardly and thereby exert a longitudinal pull on the operating cable 24. Should the brackets 11 strike an obstruction at either side of the vehicle, said brackets will be swung outwardly on their pivotal axis and in like manner exert a longitudinal pull on the operating cable 24.

In order to return the brackets to normal position after being swung outwardly, I provide a connecting member 25 having its opposite ends secured to the brackets 11 and its intermediate portion provided with a coiled spring 26, the tension of which is such as normally to hold the stop fingers 14 in contact with the rock shaft 9. As the elements comprising the fender normally project in front of the hood of the automobile, means is provided for raising the fender so as to be out of the way when parking the vehicle. In order to accomplish this result, I key or otherwise secure to the rock shaft a wheel or pulley 27, around which is passed a belt 28 extending through a conduit 29 for attachment to a reel 30 mounted for rotation in a suitable casing secured to the standard of the steering wheel, as shown. Fastened to one end of the reel 30 is a master gear 30' which meshes with a small pinion 30'' provided with a hand crank 31. The strands of the belt 28 are oppositely wound on the reel 30 so that by rotating the handle 31 in one direction the belt will operate to rock the shaft 9 and elevate the brackets 11 and their associated parts to the upright or inoperative position shown in Figure 1 of the drawings and when the crank or handle 31 is rotated in the reverse direction the parts will be lowered to operative position. Projecting from the shaft 9 is a boss 32 which engages spaced stop pins 33 on the chassis 10 and serves to limit the rocking movement of said shaft. The roller 19 is preferably offset with respect to the longitudinal axis of the passage 21 so as to permit the flexible element 18 to engage the roller 19 without kinking or bending the cable and thereby insure proper function of the parts.

Secured to the base of the automobile in any suitable manner is a box-like casing 34 in which is pivotally mounted for rocking movement on trunnions 35 a vacuum cylinder 36 having a piston 37 slidably mounted therein and provided with a piston rod 38 normally projecting through one end of the vacuum cylinder, as best shown in Figure 7 of the drawings. Connected with the opposite ends of the cylinder 36 are flexible tubes or conductors 39 leading to he manifold 8 so that, when the engine is running, air will be exhausted from the cylinder 36, there being suitable manually operated valves 40 disposed in the conductors 39 at a point adjacent the manifold, as shown, for the purpose of cutting off the suction to the cylinder 36 after a vacuum has been created therein. Extending transversely of the casing 34 at the rear of the cylinder 36 is a rock shaft 41 to which are adjustably secured by set screws 42 a plurality of depending arms 43, preferably three in number, as shown. The intermediate arm is pivotally connected at 44 with the adjacent end of the piston rod 38 while one of the outer arms 43 is connected through the medium of a cable 45 with the clutch pedal 46 and the other outer arm 43 connected by a similar cable 47 to the brake pedal 48. Communicating with the interior of the cylinder 36 and extending through the rear head thereof is an air tube or conductor 49, the outer end of which is normally closed by a pivoted cut-off valve 50. The purpose of the tube 49 is to admit air at atmospheric pressure to the interior of the cylinder 36 for moving the piston 37 rearwardly and through the medium of the arms 43 and cables 45 and 47 actuate the clutch and brake pedals to automatically stop the automobile. Secured to one end of the lever 51 of the cut-off valve is the adjacent end of a coiled spring 52, the opposite end of which is anchored to a lug 53 secured to the chassis, the purpose of the spring 52 being to automatically return the valve to closed position after it has been opened by the actuating cable 24 which latter is secured to the free end of the lever 51, as best shown in Figure 1 of the drawings.

Secured to the chassis of the automobile in advance of the brake pedal 48 is a plate 54 having a depending lug 55 formed therein and provided with an opening which slidably receives the actuating cable 24. Secured to the cable 24 in spaced relation to the lug 55 is a disk or stop 56 adapted to bear against the lug 55 and by engagement therewith limit the inward movement of the flexible contact member 18 of the fender so as to prevent a pedestrian from coming in contact with the rock shaft 9 and being injured. In other words, the stop 56 serves to limit the longitudinal movement of the actuating cable 24 and thus maintain the flexible contact member 18 always in spaced relation to the rock shaft and in position to receive the impact of a pedestrian or other object without injury to the pedestrian in case the pedestrian is struck by the automobile. Secured to the actuating cable 24 at a point adjacent the stop disk 56 is one end of a wire 57 leading to an ignition switch 58 of conventional construction mounted on the dash of the automobile so that, when the fender strikes an obstruction and a longitudinal pull is exerted on the actuating cable 24, a corresponding pull will be exerted on the wire 57 to cut off the switch to the ignition system. As a means for manually controlling the valve 50 and applying the brakes in the case of an emergency, there is provided a cable 58', the lower end of which is connected with the free end of the valve lever 51 while the upper end thereof is connected with a pull button or lever 59 mounted on the dash and in convenient position to the driver of the car. A spring 60 is preferably interposed in the cable connected with the brake pedal to compensate for any variation in travel of the clutch and brake pedals. A spring 61 is also preferably connected to the intermediate arm 42 for the purpose of returning the piston 37 to normal or off position after operation of the piston.

In operation, after the engine is started, the valves 40 are opened which causes the suction in the manifold to create a vacuum or partial vacuum in the cylinder 36, and during this operation the cut-off valve 50 will be maintained in closed position by the spring 52. Should the fender strike a pedestrian or other obstacle or object in the path of travel of the vehicle, the impact thereof will press the flexible contact member or cable 18 rearwardly and in doing so will exert a longitudinal pull on the actuating cable 24. The forward movement of the cable 24 will open the valve 50, thus allowing air at atmospheric pressure to enter the cylinder 36 through the air conductor 49, thereby forcing the piston 37 rearwardly and through the medium of the arms 43 and cables 45 and 47 actuate the clutch and brake pedals to automatically stop the automobile and at the same time actuate the switch 58 to automatically cut-off the ignition. As the cable 24 is moved forwardly by the impact on the flexible contact member 18, the stop disk 56 will engage the lug 55 and prevent said flexible contact member from being pressed rearwardly to such an extent as to allow a pedestrian to contact the rock bar 9 and become injured. Should the brackets or arms 11 strike an obstruction, said arms will be swung laterally and actuate the parts in the manner previously described and as soon as the arms clear the obstruction the spring 26 will automatically return said arms or brackets to normal position with the fingers 14 bearing against the rock shaft, as will be readily understood. If the driver of the car is aware of impending danger ahead of him or some other emergency arises necessitating instant stoppage of said car, the mechanism may be manually operated by exerting a pull on the emergency lever 59 which, in turn, opens the valve 50 and admits air at atmospheric pressure into the cylinder 36 to stop the automobile in the manner previously stated. After the mechanism has been actuated to automatically stop the car, it is necessary to evacuate the air from the cylinder 36 by opening the valves 40 and starting the engine before the parts can again function. As evacuation of the cylinder 36 requires some little time on the part of the driver, it would be impossible for a hit and run driver to escape after a collision or other accident before the arrival of an investigating officer. Furthermore, as the impact on the flexible contact member of the fender also automatically cuts off the ignition switch, fire hazard incident to such collision is reduced to a minimum. By rotating the crank 31 in one direction, the cable and its associated parts may be moved to elevated position against the hood of the automobile when parking said automobile and by rotating the crank in the reverse direction the fender will be moved to a horizontal position and in which position it will be retained by engagement of the lug on the rock shaft with the adjacent pin on the chassis of the machine. Owing to the fact that the contact member of the fender is flexible and rubber covered, danger of injury to pedestrians by contact therewith is reduced to a minimum while at the same time the flexibility of the parts insures positive and automatic application of the brakes and cut out of the ignition switch in case of collision and the like.

From the foregoing description, it is thought that the construction and operation of the device will be readily understood by those skilled in the art and further description thereof is deemed unnecessary.

Having thus described the invention, what is claimed as new is:

1. The combination with a motor vehicle including clutch and brake mechanism, of supporting arms pivotally mounted for horizontal and vertical movement on the front of the vehicle, and a flexible contact member connecting said arms and operatively connected with the clutch and brake mechanism for automatically actuating the same to stop the vehicle when said contact member encounters an obstacle in the path of travel of the vehicle.

2. The combination with a motor vehicle including clutch and brake mechanism, of a rock shaft extending transversely of the front of the vehicle, vertically movable supporting arms pivotally mounted on the rock shaft, means for rocking said shaft to elevate the supporting arms, and a flexible cable connecting said supporting arms and operatively connected with the clutch and brake mechanism for automatically actuating the same to stop the vehicle when said cable encounters an obstacle in the path of travel of the vehicle.

3. The combination with a motor vehicle including clutch and brake mechanism, of a rock shaft journaled on the front of the vehicle, supporting arms pivotally mounted on the rock shaft and provided with lateral stop fingers normally engaging said rock shaft, a spring connecting the arms, and a flexible cable secured to one of the arms and slidably engaging the other arm and operatively connected with the clutch and brake mechanism for actuating the same to stop the vehicle when said cable encounters an obstacle in the path of travel of the vehicle.

4. The combination with a motor vehicle including clutch and brake mechanism, a rock shaft journaled on the front of the vehicle, diverging supporting arms pivotally mounted on the opposite ends of the rock shaft and provided with lateral stop fingers engaging the rock shaft for limiting inward movement of said arms, a flexible cable connecting said arms and operatively connected with the clutch and brake mechanism for automatically actuating the same to stop the vehicle when said cable encounters an obstacle, and means mounted on the motor vehicle and operatively connected with the rock shaft for elevating the supporting arms and their associated parts.

5. The combination with a motor vehicle including a chassis and clutch and brake mechanism, pins extending laterally from the chassis, a rock shaft journaled in the chassis and provided with a lateral lug adapted to engage said pins for limiting the rocking movement of the shaft, supporting arms pivotally mounted on the opposite ends of the shaft, one of said arms being provided with a terminal roller, stop fingers carried by the pivoted ends of the arms and normally engaging the rock shaft, a flexible cable secured to one of the arms and extending around the roller on the other arm and operatively connected with the clutch and brake mechanism for automatically actuating the same to stop the vehicle when the cable encounters an obstacle, a pulley on said rock shaft, a reel mounted on the motor vehicle, and a belt forming a connection between the pulley and the reel for turning the rock shaft thereby to elevate the supporting arms and their associated parts.

6. The combination with a motor vehicle including clutch and brake mechanism, of a rock shaft extending transversely of the front of the vehicle, hollow supporting arms pivotally mounted on the opposite ends of the rock shaft and provided with laterally extending stop fingers bearing against the rock shaft for limiting inward swinging movement of said arms, yieldable means connecting the arms for returning the arms to normal position after they have been swung outwardly, one of said arms being provided with a terminal roller, and a flexible cable secured to one of the arms in advance of said yieldable means and having its intermediate portion engaging the roller and thence extended through the hollow portion of the adjacent arm for operative connection with the clutch and brake mechanism for automatically operating the same to stop the vehicle when said cable encounters an obstacle in the path of travel of the vehicle.

7. The combination with a motor vehicle including clutch and brake mechanism, of a rock shaft journaled on the frame of the vehicle at the front thereof, diverging arms pivotally mounted on the opposite ends of the rock shaft, one of said arms being hollow and having its free end bifurcated, a roller eccentrically mounted in the bifurcated portion of the arm, a flexible cable having one end thereof secured to one of said arms and its other end fitting over the roller and thence passing through the hollow portion of said roller carrying arm and operatively connected with the clutch and brake mechanism for automatically actuating the same to stop the vehicle when the cable encounters an obstacle, a yieldable covering for said cable, and means mounted on the motor vehicle and operatively connected with the shaft for rocking the same to elevate the supporting arms and their associated parts.

8. The combination with a motor vehicle including clutch and brake mechanism, of a vacuum cylinder having a piston operatively connected with the clutch and brake mechanism, a valve for controlling admission of air at atmospheric pressure to said cylinder, and a flexible contact member extending transversely of the front of the vehicle and connected with said valve whereby when the contact member engages an obstruction the valve will be actuated to automatically stop said vehicle.

9. The combination with a motor vehicle including clutch and brake mechanism, of a vacuum cylinder having a piston operatively connected with the clutch and brake mechanism, a valve for controlling the admission of air at atmospheric pressure to said cylinder, a flexible contact member extending transversely of the front of the vehicle and connected with said valve whereby when the contact member engages an obstruction in the path of travel of the vehicle the valve will be actuated to automatically stop said vehicle, and manually operable means connected with the valve for actuating the valve to stop the vehicle independently of said contact member.

10. The combination with a motor vehicle including clutch and brake mechanism, of a vacuum cylinder having a piston operatively connected with the clutch and brake mechanism, a valve for controlling the admission of air at atmospheric pressure to said cylinder, a flexible contact member extending transversely of the front of the vehicle and terminating in an operating cable connected with said valve, an ignition switch, and a connection between the ignition switch and said operating cable whereby when the contact member engages an obstruction in the path of travel of the vehicle the valve will be actuated to automatically stop the vehicle and simultaneously cut off the ignition switch.

11. The combination with a motor vehicle including clutch and brake mechanism, of a vacuum cylinder having a piston operatively connected with the clutch and brake mechanism, a valve for controlling the admission of air at atmospheric pressure to said cylinder, a plate secured to the frame of the vehicle and provided with a depending perforated stop lug, a flexible contact member extending transversely of the front of the vehicle and terminating in an operating cable extending through the perforated stop lug and engaging the valve, and a stop carried by said operating cable and adapted to engage the stop lug for limiting the longitudinal movement of the operating cable.

12. The combination with a motor vehicle including a manifold and clutch and brake mechanism, of a vacuum cylinder having a piston operatively connected with the clutch and brake mechanism, a spring-pressed valve for controlling the admission of air at atmospheric pressure to said cylinder, conductors leading from the manifold and connected with the opposite ends of the vacuum cylinder, manually controlled valves disposed in said conductors adjacent the manifold, and a flexible cable extending transversely of the front of the vehicle and operatively connected with the spring-pressed valve whereby when the cable engages an obstruction in the path of travel of the vehicle said valve will be actuated to automatically stop said vehicle.

13. The combination with a motor vehicle including a manifold and clutch and brake mechanism, a casing mounted on the vehicle, a vacuum cylinder pivotally mounted for tilting movement within the casing, a shaft extending transversely of said casing, arms secured to the shaft, a piston disposed within the vacuum cylinder and operatively connected with one of said arms, conductors leading from the manifold to the opposite ends of the cylinder, valves in said conductors, cables forming connections between the other arms and the brake and clutch mechanism, a valve for controlling the admission of air at atmospheric pressure to said cylinder, and a flexible contact member extending transversely of the vehicle at the front thereof and terminating in an operating cable connected with the valve whereby when the contact member engages an obstruction said valve will be actuated to automatically stop the vehicle.

14. The combination with a motor vehicle including clutch and brake mechanism, of a vacuum cylinder having a piston operatively connected with the clutch and brake mechanism, a valve for controlling the admission of air at atmospheric pressure to said cylinder, an ignition switch, a flexible contact member extending transversely of the front of the vehicle and operatively connected with the ignition switch and valve respectively whereby when the contact member engages an obstruction the valve will be actuated to automatically stop said vehicle and cut out the ignition switch, and an emergency lever operatively connected with the valve for actuating the valve to stop the vehicle independently of said contact member.

MIGUEL PADILLA PEREZ.